United States Patent
Tiritoglu

(10) Patent No.: US 9,184,614 B2
(45) Date of Patent: Nov. 10, 2015

(54) CIRCUIT FOR STORING ELECTRICAL ENERGY

(75) Inventor: Okan Tiritoglu, Stuttgart (DE)

(73) Assignee: Flextronics International Kft., Tab (HU)

( * ) Notice: Subject to any disclaimer, the term of this patent is extended or adjusted under 35 U.S.C. 154(b) by 548 days.

(21) Appl. No.: 13/298,734

(22) Filed: Nov. 17, 2011

(65) Prior Publication Data

US 2012/0126757 A1    May 24, 2012

(30) Foreign Application Priority Data

Nov. 19, 2010    (EP) .................................... 10191922

(51) Int. Cl.
*H02J 7/00* (2006.01)
*H02J 7/34* (2006.01)

(52) U.S. Cl.
CPC ................. *H02J 7/007* (2013.01); *H02J 7/345* (2013.01); *Y10T 29/49716* (2015.01)

(58) Field of Classification Search
CPC ........ H02J 7/345; H02J 7/0016; Y02E 60/13; H01G 9/155; Y02T 10/7022
USPC ....................................................... 320/167
See application file for complete search history.

(56) References Cited

U.S. PATENT DOCUMENTS

| | | | |
|---|---|---|---|
| 2,367,725 A | 1/1945 | Lindh et al. | |
| 3,648,337 A | 3/1972 | Greskamp et al. | |
| 3,693,050 A | 9/1972 | Ettinger et al. | |
| 3,935,511 A * | 1/1976 | Boulanger et al. | 361/58 |
| 3,972,380 A | 8/1976 | Hudson | |
| 4,050,770 A | 9/1977 | Rigo | |
| 4,313,025 A | 1/1982 | Grube, Jr. | |
| 4,546,305 A * | 10/1985 | Goddijn et al. | 323/299 |
| 4,629,943 A * | 12/1986 | Ponce, Jr. | 315/200 R |
| 5,091,823 A | 2/1992 | Kanbara et al. | |
| 5,178,403 A | 1/1993 | Kemner et al. | |
| 5,251,721 A | 10/1993 | Ortenheim | |
| 5,678,646 A | 10/1997 | Fliege | |
| 5,760,637 A | 6/1998 | Wong et al. | |
| 5,783,928 A * | 7/1998 | Okamura | 320/122 |
| 5,942,728 A | 8/1999 | Chen | |
| 5,995,362 A | 11/1999 | Morel et al. | |
| 6,057,666 A * | 5/2000 | Dougherty et al. | 320/104 |
| 6,185,099 B1 | 2/2001 | Le Gal | |
| 6,323,623 B1 | 11/2001 | Someya et al. | |
| 6,373,152 B1 * | 4/2002 | Wang et al. | 307/150 |

(Continued)

FOREIGN PATENT DOCUMENTS

| DE | 27 25 532 A1 | 12/1978 |
|---|---|---|
| DE | 102008040018 A1 | 12/2009 |

(Continued)

OTHER PUBLICATIONS

German Office Action (english translation), dated Mar. 5, 2013, file No. 10 2008 062 657.0, Applicant: Flextronics International Kft., 8 pages.

*Primary Examiner* — Arun Williams
(74) *Attorney, Agent, or Firm* — Haverstock & Owens LLP

(57) ABSTRACT

A circuit for storing electrical energy, in particular for installation within a motor vehicle, comprises at least one capacitor and a temperature-dependent resistor by means of which the at least one capacitor can be charged. The circuit may be included in a motor vehicle. Alternatively, a motor vehicle may be retrofit to include the circuit.

20 Claims, 1 Drawing Sheet

(56) References Cited

U.S. PATENT DOCUMENTS

| | | | |
|---|---|---|---|
| 6,419,037 B1 | 7/2002 | Kramer et al. | |
| 6,504,422 B1 | 1/2003 | Rader et al. | |
| 6,504,442 B2 | 1/2003 | Jordan et al. | |
| 6,563,235 B1 | 5/2003 | McIntyre et al. | |
| 6,935,451 B2 | 8/2005 | Bell et al. | |
| 6,986,965 B2 | 1/2006 | Jenson et al. | |
| 7,016,177 B1 | 3/2006 | Thrap | |
| 7,275,501 B1* | 10/2007 | Laceky | 119/57.92 |
| 7,482,816 B2 | 1/2009 | Odajima et al. | |
| 7,561,429 B2 | 7/2009 | Yahata et al. | |
| 7,619,878 B1 | 11/2009 | Cook | |
| 7,724,551 B2 | 5/2010 | Yanagida et al. | |
| 8,044,706 B2 | 10/2011 | Saman et al. | |
| 8,240,411 B2 | 8/2012 | Nakatsu et al. | |
| 8,258,792 B2 | 9/2012 | Vandensande | |
| 8,338,721 B2 | 12/2012 | Bardia et al. | |
| 8,462,531 B2 | 6/2013 | Nishikimi et al. | |
| 2001/0033473 A1 | 10/2001 | Itahashi et al. | |
| 2001/0035733 A1* | 11/2001 | Murphy et al. | 320/107 |
| 2002/0079865 A1* | 6/2002 | Thomas et al. | 320/136 |
| 2004/0264223 A1 | 12/2004 | Philstrom et al. | |
| 2005/0168911 A1 | 8/2005 | Staib | |
| 2005/0225305 A1 | 10/2005 | Thrap | |
| 2006/0104006 A1 | 5/2006 | Saito et al. | |
| 2007/0000775 A1 | 1/2007 | Nakahara et al. | |
| 2007/0007259 A1 | 1/2007 | Mikhailov | |
| 2007/0109715 A1 | 5/2007 | Azuma et al. | |
| 2007/0274027 A1 | 11/2007 | Vetter et al. | |
| 2008/0049476 A1 | 2/2008 | Azuma | |
| 2008/0150620 A1 | 6/2008 | Lesso | |
| 2008/0310079 A1 | 12/2008 | Toia et al. | |
| 2009/0145674 A1 | 6/2009 | Lee et al. | |
| 2009/0167315 A1 | 7/2009 | Lindsey | |
| 2009/0225496 A1 | 9/2009 | Toia et al. | |
| 2010/0060243 A1 | 3/2010 | Niigaki et al. | |
| 2010/0225283 A1* | 9/2010 | Hsia et al. | 320/167 |
| 2010/0305794 A1 | 12/2010 | Foster | |
| 2011/0045323 A1* | 2/2011 | Ooi et al. | 429/50 |
| 2012/0084033 A1 | 4/2012 | Liu et al. | |
| 2013/0200860 A1* | 8/2013 | Takeda et al. | 320/167 |
| 2013/0271092 A1* | 10/2013 | Borkar | 320/167 |
| 2013/0279114 A1 | 10/2013 | Nishikimi et al. | |
| 2013/0307489 A1* | 11/2013 | Kusch et al. | 320/162 |

FOREIGN PATENT DOCUMENTS

| | | |
|---|---|---|
| EP | 1 215 797 A2 | 12/2001 |
| EP | 1 518 723 A1 | 3/2005 |
| GB | 2083720 A | 3/1982 |

* cited by examiner

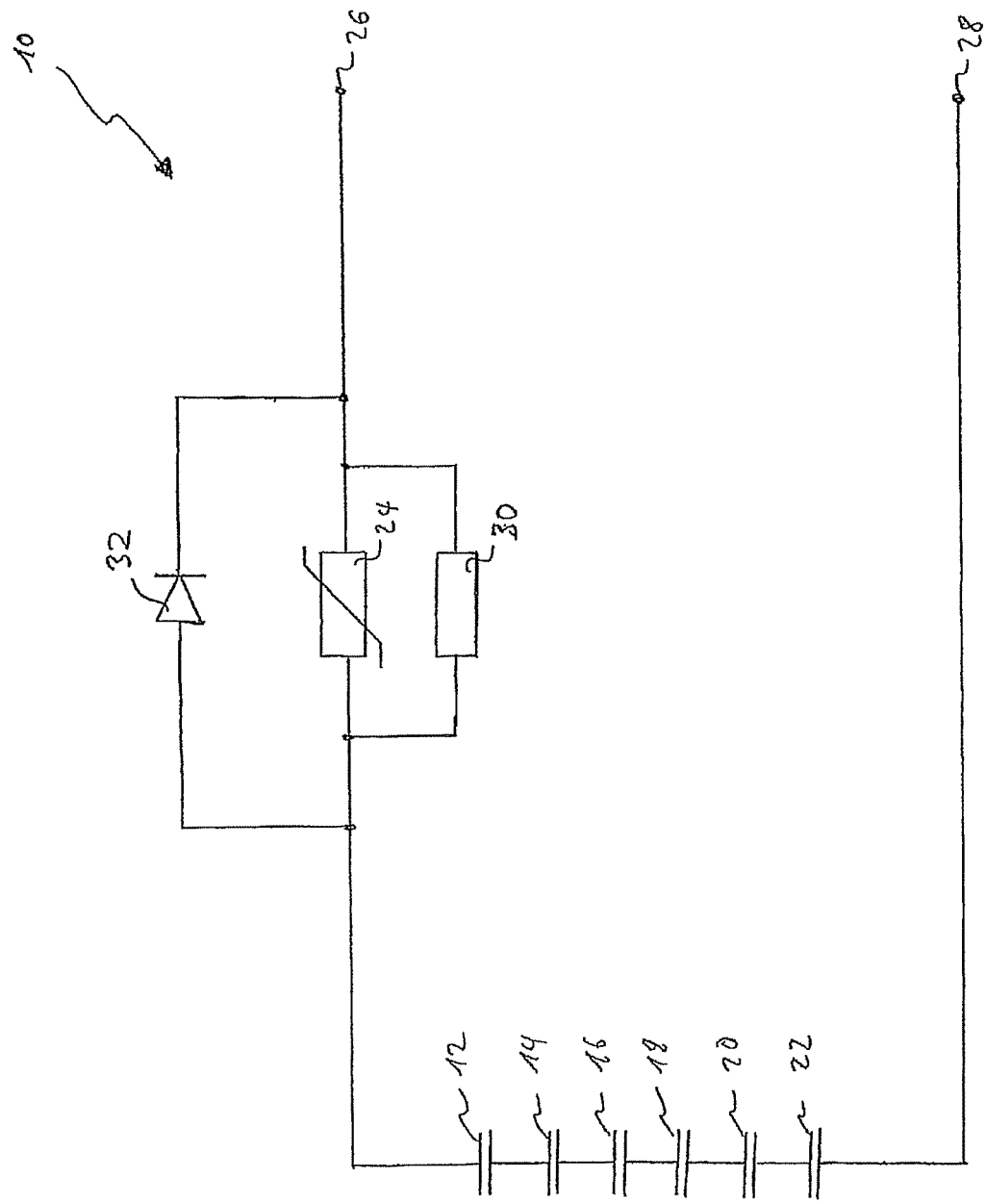

CIRCUIT FOR STORING ELECTRICAL ENERGY

BACKGROUND OF THE INVENTION

1. Field of the Invention

The present invention relates to a circuit for storing electrical energy, in particular for installation within a motor vehicle.

2. Background Information

Using batteries in motor vehicles to store electrical energy, particularly lead acid batteries, is known from the prior art.

Capacitors for storing electrical energy are furthermore known in the prior art.

It is a task of the present invention to provide a further circuit for storing electrical energy, in particular for installation within a motor vehicle. Further tasks of the inven-tion relate to providing a motor vehicle having such a circuit as well as providing a method of retrofitting a motor vehicle so that it can make use of the circuit.

SUMMARY OF THE INVENTION

The first task is solved by a circuit in accordance with claim 1. The further tasks are solved by a motor vehicle in accordance with claim 8 and a method in accordance with claim 1. Embodiments of the circuit are set forth in the dependent claims.

The invention comprises a circuit for storing electrical energy, in particular for installa-tion within a motor vehicle, having at least one capacitor and a temperature-dependent resistor by means of which the at least one capacitor can be charged.

The temperature-dependent resistor can thereby control, in particular limit, the flow of current during the charging pro-cess.

In one embodiment, the circuit comprises a diode by means of which the at least one capacitor can be discharged. This allows the capacitor to be discharged without the current being limited by the temperature-dependent resistor.

In one embodiment, the inventive circuit comprises an additional resistor. Same can be connected to the tempera-ture-dependent resistor in parallel or in series. In most cases, conventional resistors are more economical than tempera-ture-dependent resistors. Because of the additional resistor, the temperature-dependent resistor has the potential to be of smaller dimensions, whereby it then becomes cheaper.

In one embodiment, the at least one capacitor is a double layer capacitor. Double layer capacitors have the advantage of exhibiting high energy densities.

In particular, the capacitor can be an UltraCAP. An Ultra-CAP is a particularly common and readily available double layer capacitor having advantageous properties.

In one embodiment, the temperature-dependent resistor is a PTC thermistor (PTC=positive temperature coefficient). One property of such a PTC thermistor is that the resistance it provides increases at higher temperatures. Without a tem-perature-dependent resistor, very high currents could poten-tially occur when charging the capacitors, whereby circuits could possibly blow, for example. External overload or short circuit safeguards could additionally be tripped. The PTC thermistor has the property of its resistance becoming higher as it is warmed. Its higher resistance counteracts high current flow and thus further heating. By so doing, the PTC ther-mistor is able to limit the current flow to prevent an excessive amount of heat from being generated and protect the circuits from being blown.

In one embodiment, the at least one capacitor and the temperature-dependent resistor are arranged on a lead frame. In this embodiment, the components are designed as conven-tional components and not as surface mounted devices (SMD). Doing so does away with the need for a circuit board, although a circuit board can also be alternatively used in addition. There are cost benefits when there is no need to provide for SMDs.

The present invention additionally relates to a motor vehicle equipped with a circuit according to the invention.

The invention further relates to a method for retrofitting a motor vehicle. The method encompasses replacing the bat-tery found in a conventional motor vehicle with a circuit in accordance with the invention.

BRIEF DESCRIPTION OF THE DRAWINGS

In describing further details and advantages of the present invention, the following will make reference to FIG. 1 which shows an embodiment of an inventive circuit.

DETAILED DESCRIPTION OF AN ILLUSTRATIVE EMBODIMENT

The embodiment shown in FIG. 1 of an inventive circuit 2 comprises six capacitors 12, 14, 16, 18, 20, 22, UltraCAP cells in particular. Advantages result when the UltraCAP cells have a well-matched capacity relation to one another as the cells are neither voltage-checked nor balanced during the charging process. Such coordination can be realized in a selection process during the manufacturing of the UltraCAPs, for example. Additional capacitors can moreover be provided so that there is sufficient voltage reserve for the cell stack. The serial arrangement to the UltraCAP cells shown in FIG. 1 allows e.g. maximum charge voltages in the range of 12 volt or 24 volt. Individual UltraCAP cells usually have a maxi-mum voltage of 2.5-2.7 volt.

The depicted embodiment of an inventive circuit 2 further comprises a PTC thermistor 24. Said PTC thermistor 24 enables the capacitors 12, 14, 16, 18, 20, 22 to be charged by a voltage applied to the connections 26, 28. In so doing, the PTC thermistor 24 regulates the charge current independently of the charge status of the capacitors 12, 14, 16, 18, 20, 22. A conventional resistor 30 is provided parallel to the PTC ther-mistor 24 which allows the PTC thermistor 24 to be of smaller design, whereby it becomes cheaper. Alternatively, the con-ventional resistor 30 can also be in serial arrangement with the PTC thermistor 24. It is moreover conceivable for a first additional resistor to be disposed parallel to the PTC ther-mistor 24 and a second additional resistor to be in serial arrangement with the PTC thermistor 24. In the depicted circuit 2, the capacitors 12, 14, 16, 18, 20, 22 are dis-charged by means of a diode 32 in parallel connection with the PTC thermistor 24. The diode allows higher discharge currents than would be realized with the PTC thermistor.

The invention can exhibit various advantages. Compared to conventional lead acid batteries, capacitors enable signifi-cantly higher cyclization. As a rule, lead acid batteries can be fully charged and discharged about 50 times. In contrast thereto, capacitors can be recharged between 50,000 and 1,000,000 times. When used in a motor vehicle, for example, the inventive circuit can thus remain operational for the entire life of the vehicle. This eliminates the necessity of having to go to a mechanic to have the vehicle's energy storage device replaced. For applications that require less energy content, capaci-tors offer weight and scale advantages compared to a lead acid battery of similar capacity. As a general rule, the circuit according to the invention can replace a lead acid battery in a motor vehicle without problem.

The remarks made with reference to FIG. 1 are purely illustrative and not to be interpreted as limiting. The embodiment shown in FIG. 1 can naturally be modified without deviating from the inventive concept as set forth in the claims.

LIST OF REFERENCE NUMERALS 2 circuit
12, 14, 16, 18, 20, 22 capacitor
24 PTC thermistor
26, 28 connections
30 resistor
32 diode

What is claimed is:

1. A circuit for storing electrical energy, in particular for installation within a motor vehicle, comprising
    at least one capacitor;
    a temperature-dependent resistor by means of which the at least one capacitor is charged and which limits the flow of current during the charging process; and
    a diode by means of which the at least one capacitor is discharged without the current being limited by the temperature-dependent resistor, wherein the at least one capacitor is permanently coupled to be in direct electrical contact with the temperature-dependent resistor and the diode.

2. The circuit according to claim 1 having an additional resistor connected to the temperature-dependent resistor in parallel or in series.

3. The circuit according to claim 1 wherein the at least one capacitor is a double layer capacitor.

4. The circuit according to claim 1 wherein the temperature-dependent resistor is a PTC thermistor.

5. The circuit according to claim 1 wherein the at least one capacitor and the temperature-dependent resistor are arranged on a lead frame.

6. The circuit according to claim 2 wherein the at least one capacitor is a double layer capacitor.

7. The circuit according to claim 2 wherein the temperature-dependent resistor is a PTC thermistor.

8. The circuit according to claim 6 wherein the temperature-dependent resistor is a PTC thermistor.

9. The circuit according to claim 7 wherein the at least one capacitor and the temperature-dependent resistor are arranged on a lead frame.

10. A motor vehicle including a circuit for storing electrical energy, the circuit comprising
    at least one capacitor;
    a temperature-dependent resistor by means of which the at least one capacitor is charged and which limits the flow of current during the charging process; and
    a diode by means of which the at least one capacitor is discharged without the current being limited by the temperature-dependent resistor, wherein the diode permanently couples with the temperature-dependent resistor in parallel as a lower resistant bypass during a discharging process.

11. The motor vehicle of claim 10 further including in the circuit an additional resistor connected to the temperature-dependent resistor in parallel or in series.

12. The motor vehicle of claim 10 wherein the at least one capacitor is a double layer capacitor.

13. The motor vehicle of claim 10 wherein the temperature-dependent resistor is a PTC thermistor.

14. The motor vehicle of claim 10 further including a lead frame and the at least one capacitor and the temperature-dependent resistor are arranged on the lead frame.

15. A method of retrofitting a motor vehicle comprising
    removing a battery that stores electrical energy, and replacing the battery with a circuit that comprises
    at least one capacitor;
    a temperature-dependent resistor by means of which the at least one capacitor is charged and which limits the flow of current during the charging process; and
    a diode by means of which the at least one capacitor is discharged without the current being limited by the temperature-dependent resistor, wherein the at least one capacitor is permanently coupled to be in direct electrical contact with the temperature-dependent resistor and the diode.

16. The method of claim 15 wherein the circuit further includes an additional resistor connected to the temperature-dependent resistor in parallel or in series.

17. The method of claim 15 wherein the at least one capacitor is a double layer capacitor.

18. The method of claim 15 wherein the temperature-dependent resistor is a PTC thermistor.

19. The method of claim 15 further including arranging the at least one capacitor and the temperature-dependent resistor on the lead frame.

20. The method of claim 19 wherein the temperature-dependent resistor is a PTC thermistor.

* * * * *